ALFRED FRANK PIERCE
INVENTOR.
REYNOLDS & BEACH
ATTORNEYS
BY Robert W. Beach

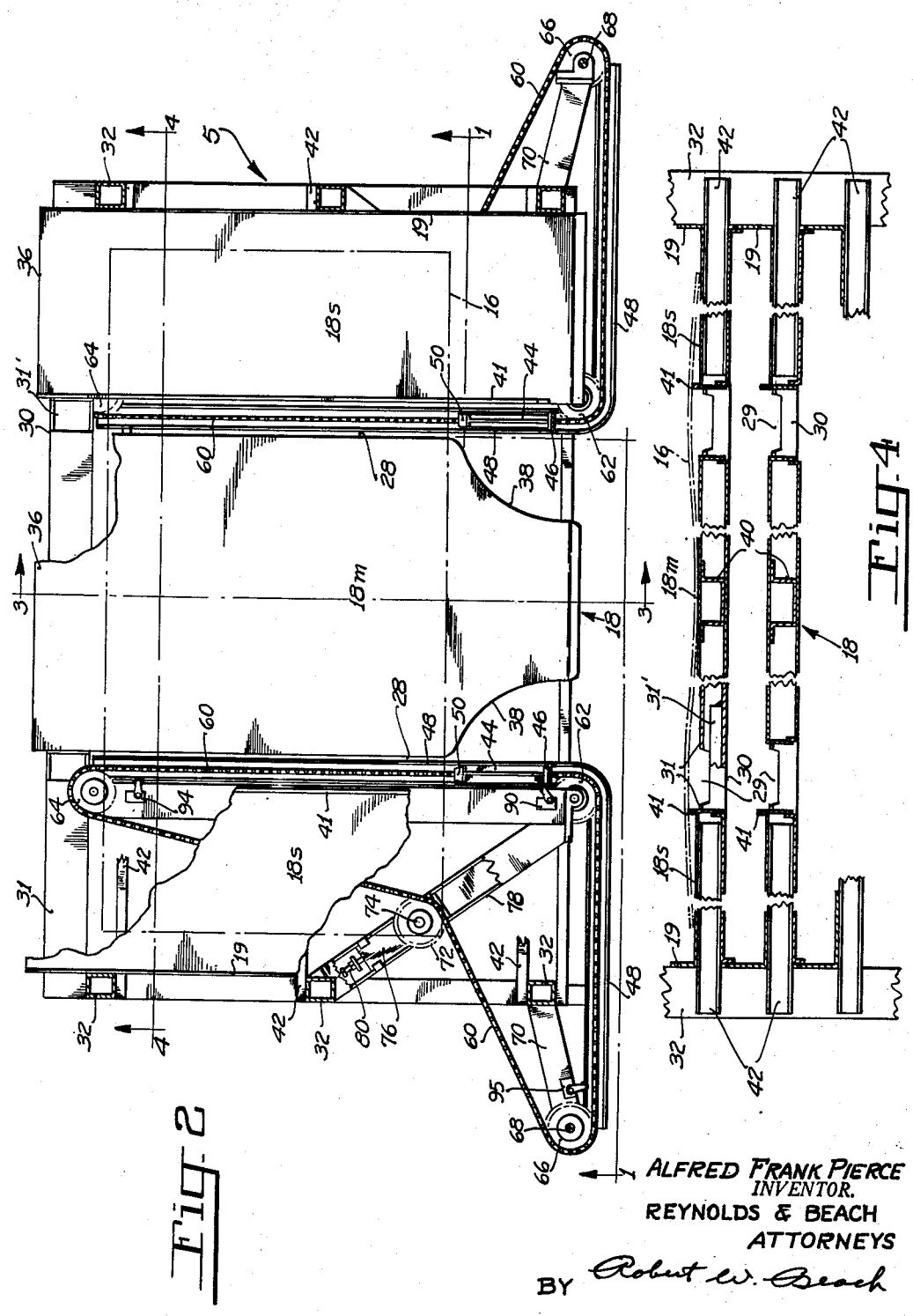

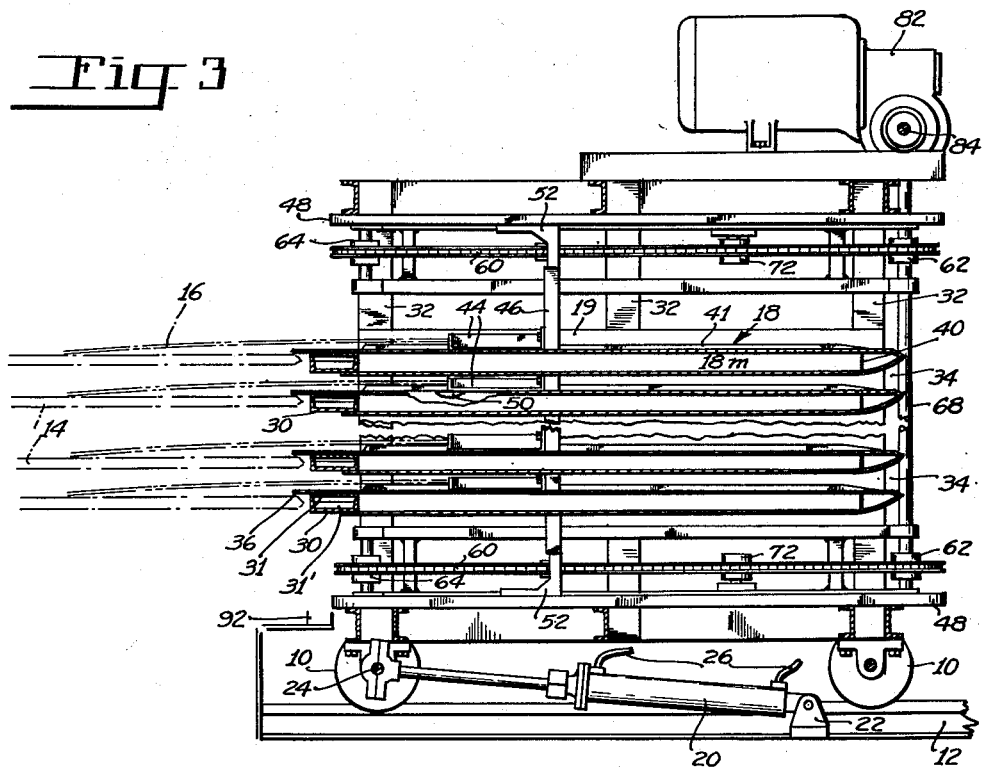
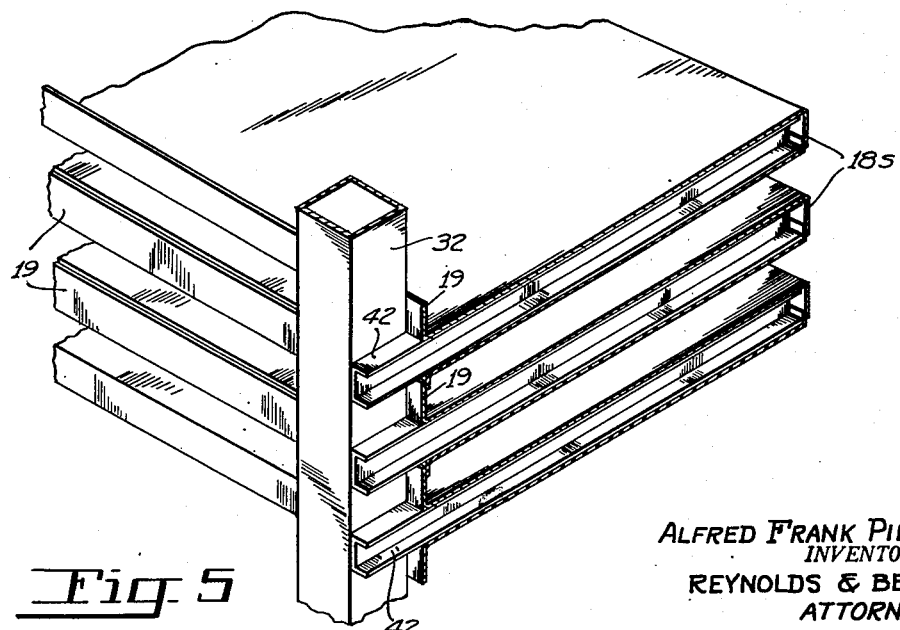

Dec. 22, 1953  A. F. PIERCE  2,663,434
SHEET CHARGING APPARATUS
Filed May 23, 1949  6 Sheets-Sheet 4

ALFRED FRANK PIERCE
INVENTOR.
REYNOLDS & BEACH
ATTORNEYS
BY Robert W. Beach

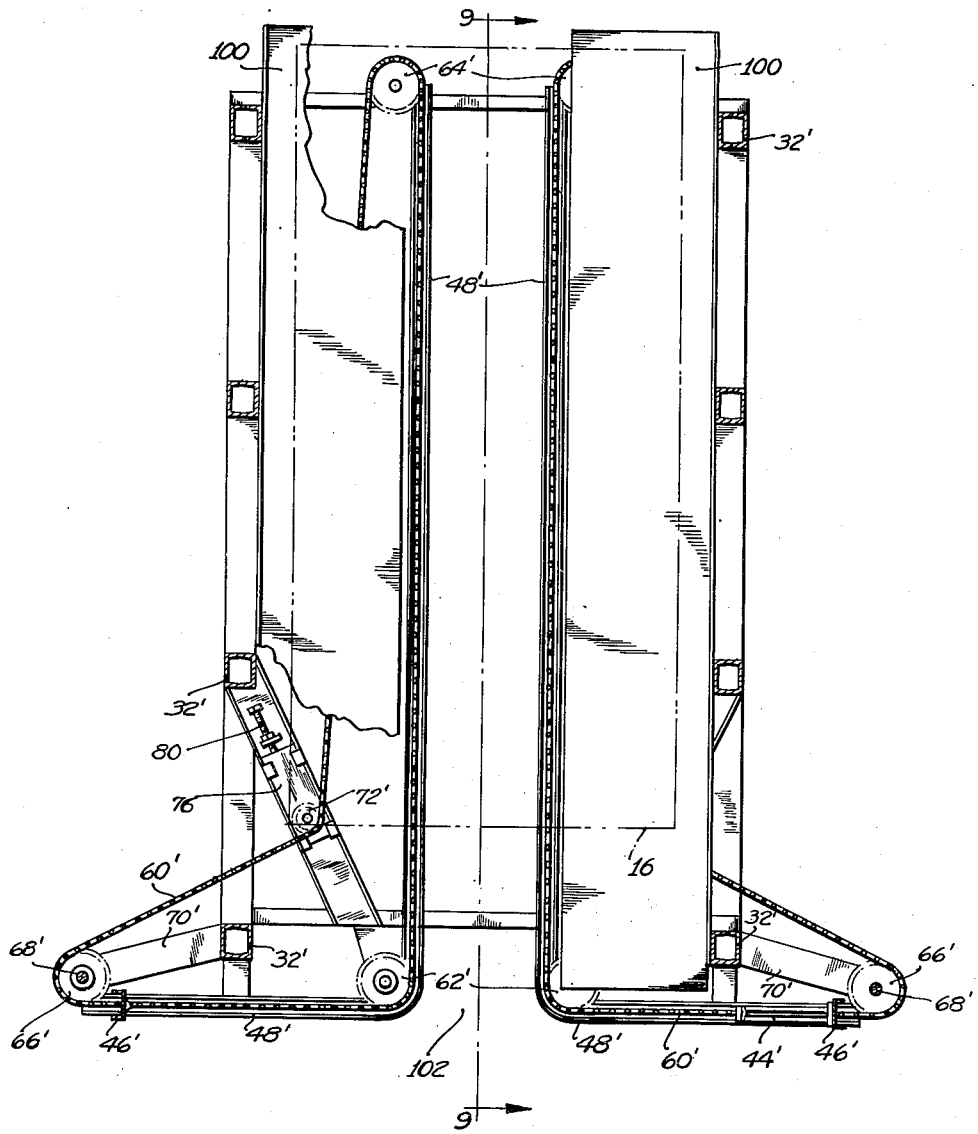

Dec. 22, 1953     A. F. PIERCE     2,663,434
SHEET CHARGING APPARATUS

Filed May 23, 1949     6 Sheets-Sheet 6

ALFRED FRANK PIERCE
INVENTOR.
REYNOLDS & BEACH
ATTORNEYS
BY Robert W. Beach

Patented Dec. 22, 1953

2,663,434

UNITED STATES PATENT OFFICE 2,663,434

SHEET CHARGING APPARATUS

Alfred Frank Pierce, Tacoma, Wash., assignor to American Manufacturing Company, Inc., Tacoma, Wash., a corporation of Washington Application May 23, 1949, Serial No. 94,774

7 Claims. (Cl. 214—1)

This invention relates to sheet material handling apparatus, and more particularly to mechanical charging devices capable of delivering a plurality of sheets in a single charging operation, the sheets being spaced apart, and aligned normal to their faces. The invention is herein illustratively described by reference to its application to charging of veneer sheets into a multiplaten heated plywood bonding press. A particular difficulty in that case is that of handling the large, flimsy and usually warped nature of veneer. However, it will be understood that the invention extends equally to handling other types of sheet material, another example being fiberboard, and to charging various types of multi-opening receiving devices, whether storage or drying racks, transport racks, presses or the like.

When bonding plywood in a heated press, loading of all press openings simultaneously is highly desirable; otherwise, during the loading process, the adhesive coating on one veneer sheet or group of sheets inserted initially into one press opening will dry out during the time taken subsequently to complete the loading operation. The results are then not uniform since the sheets and adhesive layers thereon are cured differently. Another important advantage of simultaneous charging, as distinguished from successive charging, of the press openings, resides in the resulting reduction in charging time, made possible by utilizing the usual two or three-minute bonding period of the press to reload the cooperating press charger. Thus the charger is ready to recharge the press the instant it reopens and is relieved of its present charge.

A realization of the foregoing advantages of simultaneous charging over successive charging is not new with this invention, but prior devices for effecting simultaneous charging in plywood and fiberboard manufacture have certain disadvantages. Charges of the reciprocating pusher element type, wherein the sheet material is supported first on racks or shelves adjacent to the press openings and then swept from the racks edgewise into the open press by retractible pusher mechanism have, in my opinion, been generally the most satisfactory. Accordingly, the present invention is in the nature of an improvement in such devices.

A general object of the present invention is to provide a compact and reliable press charger of the multi-shelf type having general utility and designed to reduce materially the inconvenience, the labor and the cost, especially in time, of the charging operation. A more particular object is to devise a multi-rack pusher type, sheet charging apparatus particularly suited for handling large sheets of material, such as veneer, fiberboard and perhaps light metals.

A further object of the invention is to provide an improved charger which is easily loaded and incorporates a minimum number of moving or complex parts, so that it will be durable, and easily constructed, operated and maintained. ranged in relation to the press which it serves The charger is so constituted and may be so arthat the chances of misoperation or of work blockages, either in the charger itself or in the transitional spaces between the charger and the press, if not altogether eliminated, will be negligible.

In attaining these and other objects, one feature of my improved charging apparatus resides in the combination of a plurality of sheet-supporting shelves or racks mounted in series one above another, the individual shelves being supported in cantilever fashion and in such manner that the entrances thereto at the side of the charger opposite the adjacent press are entirely free of any supports or other obstructing parts which might tend to interfere with loading the charger racks with veneer.

Furthermore the individual racks are of thick, hollow construction, including upper and lower wall sheets internally reinforced by cantilever beams. Preferably the shelves are of a thickness slightly greater than press platen thickness and their sheet-receiving ends are tapered to afford flared guide entrances between adjacent shelves to aid in the insertion of the sheets therebetween.

In one illustrated embodiment of the invention the individual racks are formed in two sections mounted spaced apart edgewise transversely of the line of movement of the veneer from the charger into the press. The shelf sections are supported primarily by cantilever means from the sides of the unit. In this form the shelves are arranged such that the elongated veneer sheets are advanced endwise between the shelves.

In a second illustrated and alternative form, the racks are disposed with their long edges transverse to the direction of movement of the panels instead of parallel thereto, and the rack side sections are separated more widely in a transverse plane. A third or central rack section is then mounted between them, projecting from the discharge end of the device into such opening and separated from the adjacent side sections by narrow openings extending continuously from the end of the charger opposite the press substantially to its end adjacent to the press. With this form of rack the elongated veneer is moved sidewise through the charger and into the press.

In both forms the vertically aligned openings between rack sections, in the first the wide central openings between side sections of the successive racks, and in the second the two series of comparatively narrow openings between side and central rack sections, afford an access passageway for movement directly through the racks toward the press of a pair of coacting sheet transfer means. Each such means includes a vertical bar spanning the column of spaced racks, and sheet-engaging pusher arms mounted in spaced parallel relationship on such bar at the rack levels, to slide the sheets off the racks and into the adjoining press openings.

A particular feature of the invention resides in guiding the coacting pusher arms for movement between an initial position retracted beyond the sides of the chamber to enable loading the same without interference, and rack-discharging position in which the sheet-engaging pusher arms project somewhat into the press. The pusher arms also have an intermediate, "ready" position adjacent to the engageable sheet edges, assumed after the charger is loaded, so that the instant the press is ready for more sheets the pusher arms will commence advancing them into the press without delay.

Still another feature is to have the entire unit movable relative to the press, so that its sheet-supporting shelves may overlap the press platens during a charging operation, while immediately thereafter the charger unit can be withdrawn to clear the press for reclosure thereof.

These and other features, objects and advantages of the invention will become further evident from the following detailed description based on the accompanying drawings.

Figure 2 is a horizontal sectional view of the same form, shown in this case with the transfer mechanism advanced to engage the sheets for movement into a press (not shown), parts of the charger being broken away to show details of the chain assembly driving the pusher, on line 2—2 of Figure 1.

Figure 3 is a vertical sectional view taken on line 3—3 of Figure 2, at the mid-plane of the charger.

Figure 4 is a vertical section taken on line 4—4 of Figure 2, showing a fragmentary portion of the charger rack structure.

Figure 5 is an isometric view illustrating further details of rack construction, viewed in the direction of the arrow 5 in Figure 2.

Figure 8 is a horizontal sectional view taken along the line 8—8 of Figure 7, with parts broken away to illustrate details of the drive chain assembly in the transfer mechanism.

Figure 1:
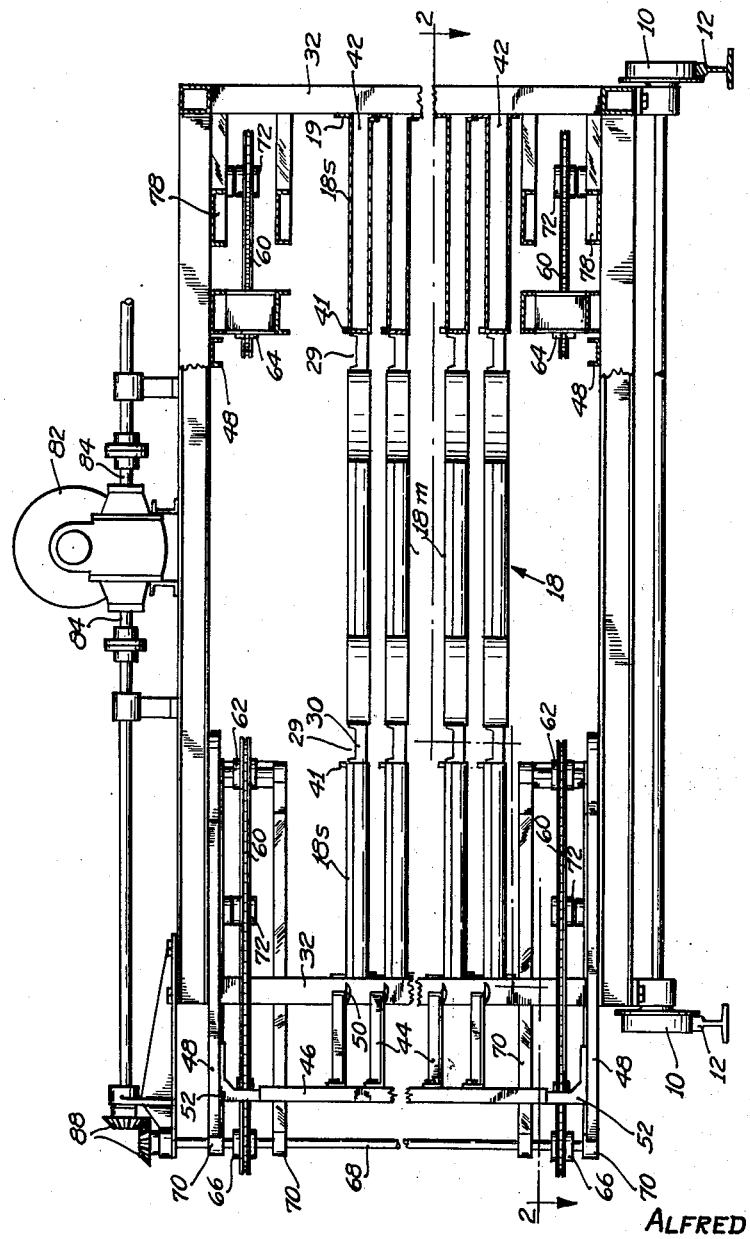
Figure 1 is a front elevation view, taken partly in section on the line 1—1 of Figure 2, of the second-mentioned form of the press charger, shown with the reciprocable work transfer mechanism in its retracted position.

In its form shown in Figures 1 to 6, the charger unit is mounted for travel on wheels 10 over tracks 12 toward and away from the input side of the press. Such movement is conveniently effected by the double-acting hydraulic cylinder and piston unit 20 shown in Figure 3 connected pivotally at one end to the fixed bracket 22 and by the free end of its piston rod to the charger unit axle 24. Pressure-fluid is delivered through tubes 26 to opposite ends of the cylinder from a suitable pressure source (not shown) to actuate the hydraulic piston.

In its withdrawn position the charger unit is located a convenient distance from the press where it may be loaded without interference from or with the press, and in its forward or discharge position the charger unit's shelves or racks 18 slightly overlap the press platens 14 shown by dot-dash lines in their open position (Figure 3). In the forward position of the charger unit the veneer panel groups 16 are then slid over a substantially continuous supporting surface directly from the racks onto the adjoining press platens.

The individual racks 18 in this form include a central rack section 18m and, adjacent thereto on opposite sides, side sections 18s (Figures 1 and 2). Between central sections and side sections of the spaced, vertically-aligned horizontal racks vertical passages or openings 28 are formed. These extend from the charger unit's end remote from the press substantially to its opposite end and constitute the two parallel passages through which the coacting pusher means previously mentioned are moved, as will be explained more fully.

The central sections 18m and side sections 18s of racks 18 are supported in cantilever fashion so as to leave the input or loading end of the charger unit entirely free of obstructions which could interfere with insertion of sheets onto its racks. It is highly desirable that the racks be of hollow sheet metal construction so that they may be light and strong, and they are sufficiently thick to restrict the vertical spacing between adjacent racks enough to prevent the top veneer sheet of a group of sheets on a rack curling up or warping so as to catch on the lower edge of the next higher press platen during charging of the press, as it may otherwise tend to do.

As shown in Figures 3 and 4, the individual central sections 18m are supported by cantilever beams 40 mounted on transversely extending channel beams 30 located at the discharge end of the unit. Beams 30 act also as lateral braces in the charger framework, being secured at their ends to corner posts 32 (Figure 3). Cantilever channel beams 40 act also as reinforcing spacer members for the top and bottom sheet metal walls of the shelf sections, the sheets being appropriately bonded to the channel flanges to enhance the cantilever strength of these sections. Further strength is attained by turning the side edges of the wall sheets toward each other to form overlapping flanges and securing the flanges together (Figure 4). The input-end corners 38 of the sections 18m are cut away to clear the pusher mechanism to be described.

The individual side shelf sections 18s are supported by cantilever beams 42, as shown in Figure 5, mounted on vertical posts 32 located at the respective sides of the unit, as shown in Figures 2 and 5. These cantilever beams act also as reinforcing spacer members for the top and bottom sheet-metal walls of the shelf sections, as before. The outer side edges 19 of the sheets are flanged vertically, those of the upper sheets being turned upward and those of the lower sheets being turned downward so that adjacent flanges overlap to form retaining walls for the veneer, and to strengthen the sheets against bending between support beams 42. Likewise the inner edges of the sheets are flanged vertically, those of the upper sheets being turned downward and those of the lower sheets being turned upward to dispose adjacent flanges in overlapping relationship which are interconnected for greater rack strength.

The entrances 34 of the loader spaces between the shelves 18 (Figure 3) are flared outward to facilitate insertion of warped veneer. Flaring is accomplished by bending or converging the upper and lower sheets of the rack sections to a rather sharp edge at their input ends, as shown. At their discharge ends the racks are adapted to overlap slightly the press platens when the charger unit is moved along tracks 12 close to the input side of the press. The upper sheet wall extensions 36 of individual racks overlap the respectively adjacent press platens. In these and other respects the central and side sections are alike in form.

It will be clear, that the rack spacing and thickness of a particular unit are made to correspond approximately to the particular spacing and thickness of the platens of the press to be served thereby, with the press open, so that the spaces between the loader shelves will be properly aligned with the platen spaces for charging purposes. Upwardly projecting ribs 41 (Figure 1) extend along the inner edges of the rack side sections 18s on which the veneer rides to raise it slightly off the shelf faces and thereby minimize the sliding friction to be overcome in pushing the veneer onto and across the racks into the press.

Together, the central and side sections of an individual rack form a rectangular shelf having its shorter dimension parallel to the line of feed, the veneer 16 moving sidewise through the charger. The shelves 18 are either manually or mechanically loaded, when the charger unit is withdrawn from the press by hydraulic unit 20. When all racks are appropriately loaded with individual groups of veneer sheets to be bonded into plywood panels the charger is ready to load the press, which operation is carried out at an appropriate time by pusher mechanism in the charger unit, operable to engage the sheets' trailing edges and simultaneously shove them from the shelves into the waiting press.

The pusher mechanism includes a coacting pair of devices supported and arranged for movement along prescribed paths. Each such device includes a vertical bar 46, shown in Figures 1 and 3, guided for movement horizontally into and reversely out of the vertically aligned passage openings or notches 28 in the racks, seen in Figure 2. The paths of movement of the pusher bars are generally L-shaped in the illustrated case, one leg of each path including the stretch along the openings 28, inward from the charger input ends of such openings, and the other stretch, at right angles thereto, extending laterally parallel to the charger input ends outward to the respective sides of the charger where the pusher devices are normally stationed during loading of the charger.

At levels between adjacent shelves the upright bars 46 carry individual cantilever pusher arms 44 projecting horizontally ahead of the bars to engage the veneer sheet edges and push the sheets fully into the press, although the bars 46 themselves cannot pass the obstructing channel beams 30 at the discharge end of the loader. When in their initially retracted positions, it will be evident from Figure 1 that neither the bars 46 nor the pusher arms 44 lie in front of the loader openings between the shelves, but are completely off to the sides of the loader where they cannot interfere with loading of it.

Each pusher arm 44 carries at its free end a foot 50 (Figure 1) having its lower face rounded to slide freely on the press platen. These feet also project forwardly beyond the ends of their respective supporting pusher arms to form ledges engageable beneath the veneer's trailing edge. The purpose of such ledge engagement is to prevent such veneer edge from slipping beneath the advancing pusher arms to escape being pushed thereby into the press. Prior to their initial contact with the veneer the ledges of the feet are located slightly below the veneer-supporting surfaces of the respective racks, and hence below the upper edges of transverse channels 30 at the discharge side of the loader. Consequently the upper flanges of these channels are notched, as indicated at 29 in Figure 1, to afford clearance for the pusher feet to be projected from the charger into the press in their extreme discharge positions. Preferably the upper sides of the channel are closed by plates 31 welded to their upturned flanges. In order to preserve their necessary bending and torsional strength to support central rack sections 18m, these notched channel beams may be appropriately reinforced, as by a plate 31' welded in the channel opening to opposite flanges thereof below the notch 29, as shown in Figure 4.

Figure 6:
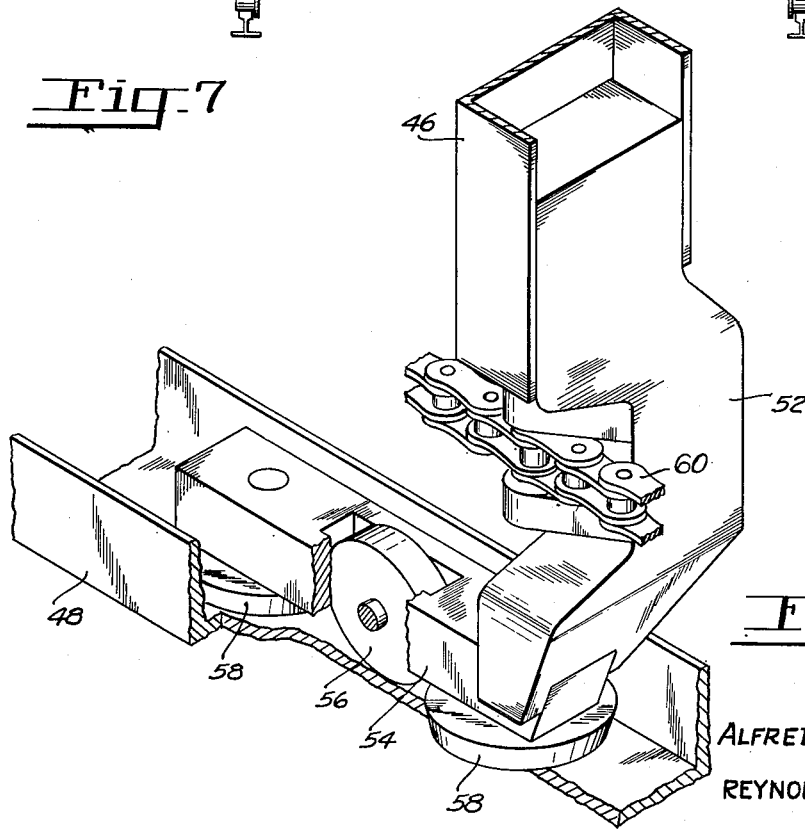
Figure 6 is an isometric detail view showing the preferred arrangement for supporting and guiding the pusher arm supports, with parts broken away.

As has been stated, each pusher bar 46 travels along an L-shaped path, including a horizontal leg to follow a notch opening 28 through the charger and another leg alongside the input end of the charger between the entrances to such opening and a location somewhat beyond the adjacent side of the charger. In order to guide the vertical pusher bars 46 for such movement, pairs of upper and lower L-shaped tracks 48 are provided by which the respective upper and lower ends of the bars are guided. These tracks, which may be channel irons, lie respectively above and below the series of racks and are appropriately supported from the charger framework with their longitudinally extending legs disposed in vertical registry with passages 28, as shown in Figure 2, and their laterally extending legs disposed alongside the vertical plane defined by the rack input edges. In Figure 6 the respective ends of the pusher bars 46 are shown mounted by connector fittings 52 on carriages 54 which roll in the channel tracks 48, guided therein laterally by wheels 58 and vertically by wheels 56. It will be understood that the particular guide means employed for directing movement of the pusher supports is not critical in that they may be of various forms and yet function for the same general purposes.

Similarly, while there are varying ways in which the guided pusher bars might well be driven for movement along their respective tracks, I have illustrated the one preferred, including drive chains 60, sections of which form an L vertically aligned with the respective sections of tracks 48. Each bar 46 has two drive chains connected to it, one above and one below the bank of racks 18. Three, and preferably four, drive chain sprockets support each chain. Sprockets 62 and 64, on stub shafts, are solely chain-locating sprockets stationed respectively at the input and output ends of the charger at the opposite ends of notches 28 and in the general plane of the track sections in registry with them. Sprockets 66, located laterally beyond the side of the loader at its input end and supported by brackets 70, are the drivers for the chain. A fourth sprocket 72, positioned to engage the return or back stretch of each chain, may be movable to serve as a convenient slack eliminator. Such sprocket may be mounted on a slide 76 capable of being shifted by screw adjustment means 80 along a horizontal channel guide 78 disposed transversely of the back stretch of chain extending between sprockets 64 and 66.

Supported beyond the sides of the loader frame, driven sprockets 66 may be interconnected by vertical drive shafts 68 journaled in the laterally projecting brackets 70 without obstructing free entry of veneer into the spaces between the racks. As shown in Figure 1, these shafts, through bevel gears 88, are driven by a reversible geared electric motor drive unit 82 turning horizontal branch shafts 84 extending laterally therefrom. By appropriate control of motor energization the pusher bars 46 are movable in either direction along their respective L-shaped tracks. Both bars are moved conjointly by the drive mechanism common to them, so that at all times they maintain corresponding contact with the veneer sheet trailing edges in a common vertical plane as they are advanced toward the press.

Following loading of the charger racks, when the pusher assemblies are retracted in the positions of Figure 1, the coacting pusher bars are preferably advanced by the drive unit 82 into the "ready" position shown in Figure 2, pending opening of the press to be charged. Thus, when the press opens, no time will be lost in initiating advance of the veneer caused by delay in moving the pusher arms into contact with the veneer. The "ready" position of the pusher assemblies is conveniently established by a limit switch 90 shown in Figure 2, controlling motor unit 82. The location of such switch may be altered appropriately to effect proper control for veneer sheets of materially different size.

As a further control feature hydraulic unit 20 is either manually or automatically actuated, coincidentally with opening of the press, by suitable switch and valve means (not shown). The charger then advances bodily to the press and trips a further limit switch 92 to remove actuating pressure from hydraulic unit 20 at the point where the charger racks reach slightly overlapping relationship with the press platens (Figure 3). If desired the same limit switch can be employed to start the drive unit 82 to initiate discharge movement toward the press of the pusher means from their previously assumed "ready" position.

Another limit switch 94 (Figure 2) stops advancing movement of the pusher assemblies the instant the entering veneer reaches its appropriate position between the press platens, and preferably at that same instant effects reverse energization of drive unit 82 to retract the pusher bars, and also reverse actuation of hydraulic unit 20 to withdraw the charger unit bodily away from the press. The press may then immediately be reclosed, and switch 95 stops pusher retraction.

The use of limit switches and controlled circuits associated therewith to accomplish the purposes and functions just described is a technique so well understood in the art that a specific circuit diagram or further detailed information is deemed unnecessary in this specification. Likewise it will be obvious that the successive phases in the cycle of operation of the press and the press charger herein described may be effected automatically or semiautomatically according to any desired plan of operation suiting a particular installation.

Figure 7:
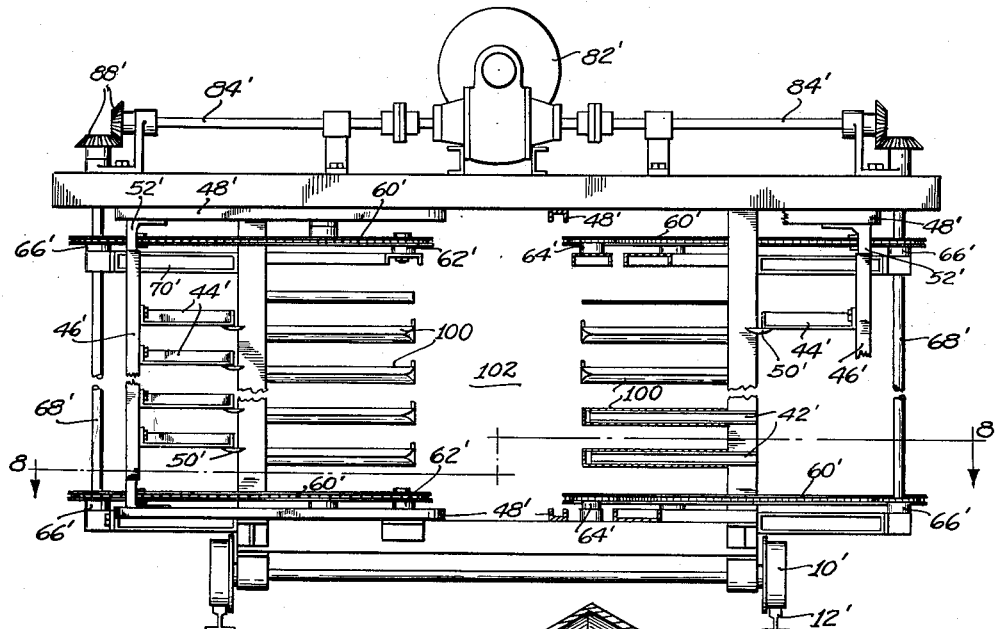
Figure 7 is a front elevation view of a second form of my improved press charger, with parts broken away.
Figure 9:
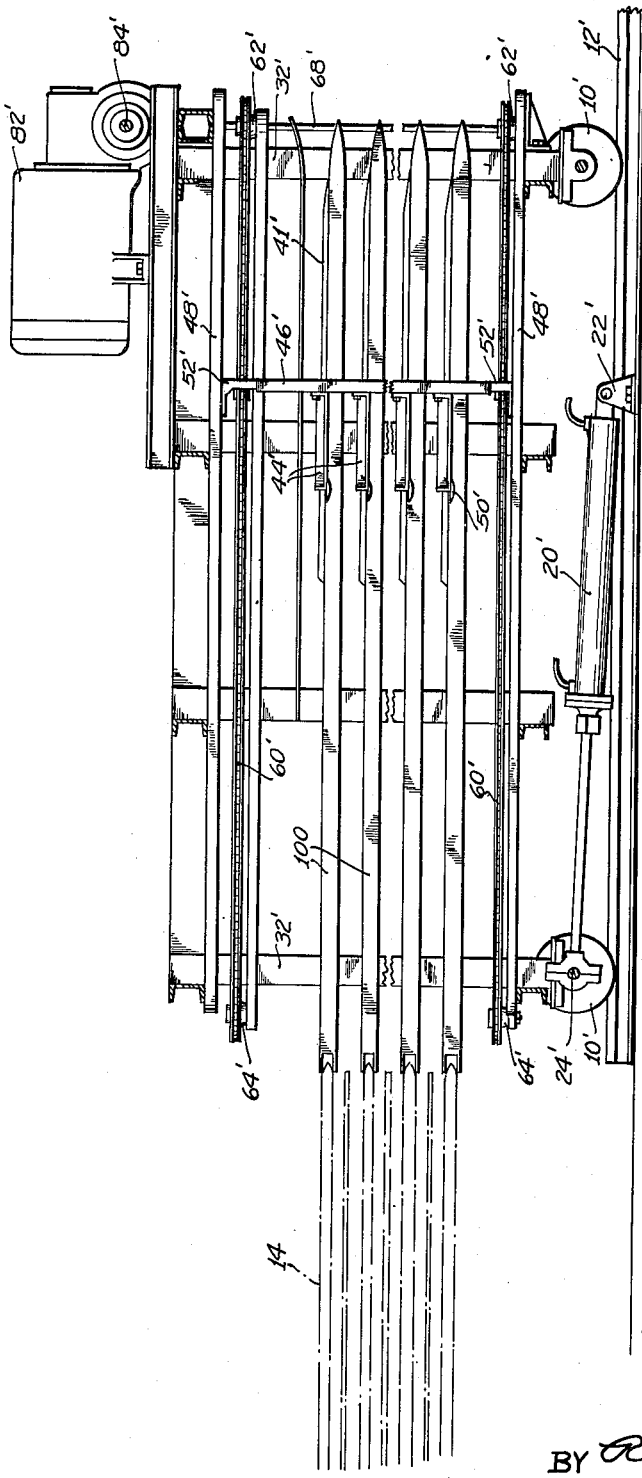
Figure 9 is a vertical sectional view taken on section line 9—9 of Figure 8 at the mid-plane of the charger unit.

In the alternative form of my invention illustrated in Figures 7 to 9, inclusive, the veneer is moved endwise, rather than sidewise, into the press, which is of the end-opening type. Accordingly, the longer dimension of the charger racks is parallel to the line of such movement. With certain variations to be described, it may be assumed that the general construction and operation of this form of the charger is similar to that previously described, so that repetitious description of similar parts is unnecessary. Parts of this press which correspond to parts of the earlier described form are designated with corresponding numerals primed. A description of certain details is omitted where it is considered unnecessary to an understanding of the differences between the two forms.

That it would be more difficult and less practicable in an end-loading press charger to support central rack sections in cantilever fashion from discharge end of the charger will be evident because of the great projecting length of such sections. Accordingly, instead of having a rack divided into three sections, one center and two side sections, the central section is omitted entirely and only side sections 100 employed. These are supported in cantilever fashion from the sides of the frame structure of the charger much like the side sections in the earlier-described form, as illustrated in Figure 5. A fairly wide gap occurs between the inner parallel edges of the side sections, through which, and alongside which edges, the pusher bars 46' travel in moving along their respective upper and lower tracks 48'.

As before, the veneer sheets are engaged by arms 44' on two pusher bars 46', at points of contact spaced apart along the veneer's edge far enough to stabilize it against swinging in its own plane as it is advanced. As shown in Figure 8, comparable to the structure of the other embodiment, chains 60' are carried by sets of sprockets, idler sprockets 64' and 62' being rotated on appropriate stub-shafts and sprockets 66' being supported and driven by vertical drive shafts 68' mounted at the sides of the machine. The geared electric drive unit 82' supplies the power through shaft 84' to the drive shaft 68'. Similarly this charger unit is rolled on wheels 10' bodily along tracks 12' between press-charging and withdrawn position by hydraulic cylinder means 20'. Likewise, the pusher bars 46', carriages and tracks 48' may be similar to their forms previously described.

The widths of the central openings 102 between the rack sections is sufficient to afford ample clearance for the pusher assemblies 44' to round the bends in tracks 48' simultaneously and enter the central space 102 on their working stroke to eject veneer from the charger into the press.

A somewhat modified discharge-end construction of the charger racks is provided in this case. As shown in Figure 9, each of the rack sections have channel recesses extending lengthwise of such ends in which the press platens 14 may be received when the charger unit is moved up into position against the press.

Having described my invention in two preferred and alternative forms it will be evident that the important features are not confined to particular details of construction herein illustrated, but may be embodied in other equivalent charger structures. Also it will be obvious that the number of cantilever-supported racks employed in any unit may vary with the particular application for which the charger is intended, and that the widths of the openings through which the pusher assemblies travel in sweeping veneer from the racks into the receiving device may vary, as may the length and the particular form of the pusher arms. Moreover, in some types of installations, bodily movement of the charger toward and away from the press may not be necessary.

I claim as my invention:

1. Sheet-charging apparatus for loading multiplaten presses and the like, comprising a plurality of generally horizontal sheet supports mounted in vertically spaced relation to enable inserting sheets into the spaces between said supports at one end of the apparatus and discharging of said sheets from the other end thereof into the spaces between press platens, said supports having vertically registering openings therein located generally intermediate opposite sides thereof and extending from the sheet-input ends thereof toward the sheet-discharge ends thereof, and sheet-pusher means including a pair of upright bars, a plurality of parallel pusher arms projecting horizontally from one side of each of said bars in vertical registry with the spaces between said supports to engage the edges of sheets supported on such supports, respectively, two pairs of upper and lower L-shaped guides located respectively above and below the plurality of sheet supports, such L-shaped guides having legs extending substantially from the sheet-discharge ends of the supports to the sheet-input ends thereof, thence laterally outward to corresponding opposite side locations spaced appreciably outward beyond the sides of said supports, respectively, cooperating guide means carried by upper and lower portions of said bars and engaging said upper and lower guides, respectively, of one of said pairs of guides, to support said bars upright and guide the same for movement along said guides between laterally retracted positions of said bars at opposite sides of the supports and sheet-discharge positions of said bars at the sheet-discharge end of said supports, said guide means maintaining said pusher arms substantially parallel to the section of said guides being engaged by said guide means during guided movement thereof along said guides, the sheet-engaging ends of said pusher arms projecting materially outward beyond the sheet-discharge end of said sheet supports in the sheet-discharge positions of said bars, and coacting means operable to move said bars conjointly between corresponding extreme positions thereof.

2. The sheet-charging apparatus defined in claim 1, wherein the openings in the supports occupy a relatively large proportion of the total width of such supports between opposite sides thereof.

3. The sheet-charging apparatus defined in claim 1, wherein the supports comprise two opposite side sections and an intermediate section separated from said side sections respectively by the openings extending from the sheet-input ends of said supports toward the sheet-discharge ends thereof, both of said openings of each support being vertically aligned, respectively, with corresponding openings of the other supports.

4. The sheet-charging apparatus defined in claim 3, and frame means including horizontal members extending across the sheet-discharge ends of the respective supports, and cantilever means projecting from said horizontal members toward the sheet input ends of said supports and carrying the respective intermediate support sections.

5. Sheet supporting apparatus comprising a plurality of generally horizontal sheet supports mounted in vertically spaced relation to receive sheets in the spaces between said supports, said supports having vertically registering slots therein opening at one end of said supports, and sheet engaging means engageable with sheets carried by said supports including a pair of upright bars, two pairs of upper and lower L-shaped guides located respectively above and below said plurality of sheet supports, said L-shaped guides having legs extending substantially from the end of said sheet supports remote from the slot openings to the slot opening ends of said supports and thence laterally outward to corresponding opposite laterally retracted locations, respectively, cooperating guides means carried by upper and lower portions of said bars and engaging the upper and lower guides, respectively, of one of said pairs of guides to support said bars upright and to guide the same for movement along said guides between such laterally retracted positions of said bars and the other extreme positions of said bars located adjacent to the ends of said supports remote from the slot openings.

6. The sheet supporting apparatus defined in claim 5, a plurality of parallel pusher arms projecting horizontally from one side of each of the upright bars and disposed in vertical registry with the spaces between the supports to engage the edges of sheets supported on such supports, respectively, and means interengaged between the guides and the guide means carried by the bars to rotate the bars for maintaining said pusher arms substantially parallel to the section of the guides engaged by the bar guide means during guided movement thereof along the guides.

7. Sheet supporting apparatus comprising a plurality of generally horizontal sheet supports mounted in vertically spaced relation to accommodate sheets in the spaces between said supports, each of said supports including two opposite side sections, an interconnecting member connecting said side sections adjacent to corresponding edges thereof, an intermediate section of a width and length each a plurality of times as great as its vertical thickness, disposed between said side sections and separated therefrom respectively by slots opening at the corresponding edges of said support side sections remote from said interconnecting member, and means supporting said intermediate section in cantilever fashion by said interconnecting member, said slots between the side sections and intermediate section of each support being vertically aligned with corresponding slots between the side sections and intermediate section of other supports forming two vertical rows of slots, and sheet engaging means including an upright bar movable into and along each of said vertical rows of slots and operable to engage sheets carried by said supports and to move such sheets along said supports.

ALFRED FRANK PIERCE.

References Cited in the file of this patent

UNITED STATES PATENTS

| Number | Name | Date |
|---|---|---|
| 1,388,422 | Forsman | Aug. 23, 1921 |
| 2,376,457 | Skoog | May 22, 1945 |
| 2,438,896 | Bowen et al. | Apr. 6, 1948 |

FOREIGN PATENTS

| Number | Country | Date |
|---|---|---|
| 433,778 | Great Britain | Aug. 15, 1935 |